United States Patent
Yoon et al.

(10) Patent No.: US 10,106,742 B2
(45) Date of Patent: Oct. 23, 2018

(54) POLYMERISABLE LIQUID CRYSTAL MATERIAL AND POLYMERISED LIQUID CRYSTAL FILM

(71) Applicant: MERCK PATENT GMBH, Darmstadt (DE)

(72) Inventors: Hyun-Jin Yoon, Anyang-si (KR); Yong-Kuk Yun, Hwaseong-si (KR); Heui-Seok Jin, Yongin-si (KR); Yong-Hyun Choi, Pyeongtaek (KR)

(73) Assignee: MERCK PATENT GMBH, Darmstadt (DE)

( * ) Notice: Subject to any disclaimer, the term of this patent is extended or adjusted under 35 U.S.C. 154(b) by 0 days.

(21) Appl. No.: 14/917,669

(22) PCT Filed: Jul. 31, 2014

(86) PCT No.: PCT/EP2014/002110
§ 371 (c)(1),
(2) Date: Mar. 9, 2016

(87) PCT Pub. No.: WO2015/036072
PCT Pub. Date: Mar. 19, 2015

(65) Prior Publication Data
US 2016/0215216 A1    Jul. 28, 2016

(30) Foreign Application Priority Data
Sep. 13, 2013   (EP) .................................... 13004474

(51) Int. Cl.
*C09K 19/52*    (2006.01)
*C09K 19/54*    (2006.01)
*C09K 19/04*    (2006.01)

(52) U.S. Cl.
CPC ............ *C09K 19/542* (2013.01); *C09K 19/52* (2013.01); *C09K 2019/0448* (2013.01)

(58) Field of Classification Search
CPC ...................................................... C09K 19/52
See application file for complete search history.

(56) References Cited

U.S. PATENT DOCUMENTS

| 7,759,442 B2 | 7/2010 | Okada et al. |
| 8,445,103 B2 | 5/2013 | Okada et al. |
| 2005/0133760 A1* | 6/2005 | Farrand .............. C09K 19/0403 252/299.01 |
| 2006/0127603 A1 | 6/2006 | Kim et al. |
| 2006/0188712 A1* | 8/2006 | Okada ................... C08F 220/18 428/354 |
| 2006/0279865 A1* | 12/2006 | Ito ...................... C09K 19/2007 359/883 |
| 2010/0304135 A1 | 12/2010 | Okada et al. |

FOREIGN PATENT DOCUMENTS

| CN | 101825727 A | 9/2010 | |
| JP | 2002194030 A * | 7/2002 | |
| JP | 2012180483 A * | 9/2012 | |
| WO | 2005005573 A1 | 1/2005 | |
| WO | WO 2005005573 A1 * | 1/2005 | ............. C09K 19/38 |
| WO | 2006062352 A1 | 6/2006 | |

OTHER PUBLICATIONS

Aminoethylated acrylic polymer; pp. 1-3 (2017); https://www.shokubai.co.jp/en/products/functionality/polyment.html.*
International Search Report and Written Opinion from PCT/EP2014/002110 dated Sep. 30, 2014.
Notification of the Second Office Action corresponding to Chinese Application No. 201480049786.6-dated May 24, 2018.

* cited by examiner

*Primary Examiner* — Chanceity N Robinson
(74) *Attorney, Agent, or Firm* — Millen White Zelano and Branigan, PC; John Sopp

(57) ABSTRACT

The invention relates to a polymer film comprising a polymerized liquid crystal (LC) material with improved adhesion to a substrate, to methods for preparing such a polymer film, to a polymerizable LC material used for the preparation of such a polymer film, and to the use of the polymer film and said polymerizable LC material for optical, electrooptical, decorative or security uses and devices.

21 Claims, No Drawings

POLYMERISABLE LIQUID CRYSTAL MATERIAL AND POLYMERISED LIQUID CRYSTAL FILM

FIELD OF INVENTION

The invention relates to a polymer film comprising a polymerised liquid crystal (LC) material with improved adhesion to a substrate, to methods for preparing such a polymer film, to a polymerisable LC material used for the preparation of such a polymer film, and to the use of the polymer film and said polymerisable LC material for optical, electrooptical, decorative or security uses and devices.

BACKGROUND AND PRIOR ART

Polymerisable liquid crystal (LC) materials are commonly used for the preparation of optical films in liquid crystal displays. These materials usually contain a certain amount of compounds with two or more polymerisable groups (di- or multi-functional), which are crosslinked to give a hard film.

However, during polymerisation certain polymerisable materials, like for example acrylates, suffer polymer shrinkage [see R. A. M. Hikmet, B. H. Zwerver and D. J. Broer Polymer (1992), 33, 89]. This shrinkage causes a lot of strain in the polymerised film and reduces the adhesion between the film and the substrate.

One technique reported in prior art to overcome this problem concentrates on modifying the substrate to improve its adhesion to the polymerised film. For example, the substrate can be subjected to special treatment, for example flame treatment as disclosed in U.S. Pat. No. 2,795,820 or GB 0 788 365, corona treatment as reported in DE 1 128 644, or plasma treatment as reported in R. L. Bersin Adhesives Age (1972) 15, 37.

Alternatively, a separate adhesion or coupling layer (typically a solution of organo-silane materials) can be coated onto the substrate to help increase adhesion of a polymer film to a substrate, like e.g. the commercially available Addid 900 ® (from Wacker GmbH, Burghausen, Germany), an amino-functional trimethoxy silane.

U.S. Pat. No. 5,631,051 discloses a method of preparing an optical compensation sheet on a transparent substrate of triacetyl cellulose (TAC), by first providing an adhesion layer of gelatine on the TAC film. Then an aligning layer is formed by coating a solution of denaturated polyvinyl alcohol (PVA), which was chemically modified by addition of polymerisable groups, onto the gelatine layer, evaporating the solvent and rubbing the surface of the polymerised PVA layer unidirectionally. Finally an optically anisotropic layer comprising discotic LC material is coated onto the rubbed surface of the PVA layer and polymerised.

U.S. Pat. No. 5,747,121 discloses a method of preparing an optical compensation sheet by coating a solution of denaturated polyvinyl alcohol (PVA), which was chemically modified by addition of polymerisable groups, onto a transparent substrate, evaporating the solvent and rubbing the surface of the PVA layer unidirectionally. Then an optically anisotropic layer comprising discotic LC material is coated onto the rubbed surface of the PVA layer and polymerised. Afterwards the film is subjected to heat treatment whereby the PVA layer and the discotic LC layer are reported to be chemically bonded to each other via free, crosslinkable groups.

However, the use of separate adhesion or aligning layers comprising isotropic materials like gelatine or PVA can negatively influence the performance of the liquid crystal film when used e.g. as an optical film.

To overcome this problem an adhesion promoter can be directly added to the polymerisable LC material formulation. For example, WO 2006/062352 A1 discloses a homeotropic aligned polymer film without using a separate adhesion or aligning layer. The polymer film is obtained by coating a polymerisable LC mixture solution including a predetermined surfactant on a plastic substrate whose surface is hydrophilic-treated, drying, and UV irradiating the mixture solution.

However, all of the above-described methods have the distinct disadvantage in that they involve extra processing steps, like a surface treatment step.

Therefore, there is still the need for an alternative polymerisable liquid crystal (LC) material for the preparation of a homeotropic aligned polymer film, which does not exhibit the drawbacks of prior art materials or if so, do only exhibit them to a less extent.

Advantageously, the polymerisable LC material for the preparation of a homeotropic aligned polymer film, should
- show favourable adhesion to a plastic substrate, such as TAC, COP, or colour filters etc.
- do not require the use of separate adhesion layer,
- do not require the use of a separate alignment layer,
- exhibit an improved uniform homeotropically alignment,
- be highly transparent to VIS-light, and
- show a favourable high temperature stability, especially in view of in-cell applications.

Other aims of the present invention are immediately evident to the person skilled in the art from the following detailed description.

Surprisingly, the inventors of the present invention have found that the above aims can be achieved and the mentioned drawbacks of prior art polymerisable LC materials can be overcome by using a polymerisable LC material comprising a low amount of an adhesion promoter. The adhesion promoter should improve adhesion of the polymerised LC film to the substrate, and at the same time should not, or only to a minor extent, negatively affect the liquid crystal phase of the material, such as the uniform orientation, or the optical properties of the film, such as the transmission.

SUMMARY OF THE INVENTION

The invention relates to a polymerisable liquid crystal (LC) material, which comprises one or more polymerisable mesogenic compounds and at least one adhesion promoter, characterized in that the adhesion promoter is selected from a (meth)acrylic side chain polymer comprising one or more primary amino groups in the side chain.

The invention further relates to a polymer film obtainable, preferably obtained from the polymerisable LC material, as described above and below.

The invention further relates to a method of production of a polymer film, as described above and below.

The invention further relates to a method of increasing the adhesion of a polymer film, obtainable preferably obtained, from a polymerisable LC material, to a substrate, preferably a plastic substrate, film or surface, by adding one or more adhesion promoters to the LC material before polymerisation.

The invention further relates to the use of a polymer film or polymerisable LC material, as described above and below, in optical, electrooptical, information storage, decorative and security applications, like liquid crystal displays, projection systems, polarisers, compensators, alignment layers, circular polarisers, colour filters, decorative images, liquid crystal pigments, reflective films with spatially varying reflection colours, multicolour images, non-forgeable documents like identity or credit cards or banknotes.

The invention further relates to a optical component or device, polariser, patterned retarder, compensator, alignment layer, circular polariser, colour filter, decorative image, liquid crystal lens, liquid crystal pigment, reflective film with spatially varying reflection colours, multicolour image for decorative or information storage, comprising at least one a polymer film or polymerisable LC material, as described above and below The invention further relates to a liquid crystal display comprising at least one polymer film or polymerisable LC material or an optical component, as described above and below.

The invention further relates to authentification, verification or security marking, coloured or multicolour image for security use, non-forgeable object or document of value like an identity or credit card or a banknote, comprising at least one polymer film or polymerisable LC material or a optical component as described above and below.

TERMS AND DEFINITIONS

As used herein, the term "polymer" will be understood to mean a molecule that encompasses a backbone of one or more distinct types of repeating units (the smallest constitutional unit of the molecule) and is inclusive of the commonly known terms "oligomer", "copolymer", "homopolymer" and the like. Further, it will be understood that the term polymer is inclusive of, in addition to the polymer itself, residues from initiators, catalysts, and other elements attendant to the synthesis of such a polymer, where such residues are understood as not being covalently incorporated thereto. Further, such residues and other elements, while normally removed during post polymerisation purification processes, are typically mixed or co-mingled with the polymer such that they generally remain with the polymer when it is transferred between vessels or between solvents or dispersion media.

The term "(meth)acrylic polymer" as used in the present invention includes a polymer obtained from acrylic monomers, a polymer obtainable from methacrylic monomers, and a corresponding co-polymer obtainable from mixtures of such monomers.

The term "polymerisation" means the chemical process to form a polymer by bonding together multiple polymerisable groups or polymer precursors (polymerisable compounds) containing such polymerisable groups.

The terms "film" and "layer" include rigid or flexible, self-supporting or freestanding films with mechanical stability, as well as coatings or layers on a supporting substrate or between two substrates.

The term "liquid crystal (LC)" relates to materials having liquid-crystalline mesophases in some temperature ranges (thermotropic LCs) or in some concentration ranges in solutions (lyotropic LCs). They obligatorily contain mesogenic compounds.

The terms "mesogenic compound" and "liquid crystal compound" mean a compound comprising one or more calamitic (rod- or board/lath-shaped) or discotic (disk-shaped) mesogenic groups. The term "mesogenic group" means a group with the ability to induce liquid-crystalline phase (or mesophase) behaviour.

The compounds comprising mesogenic groups do not necessarily have to exhibit a liquid-crystalline mesophase themselves. It is also possible that they show liquid-crystalline mesophases only in mixtures with other compounds, or when the mesogenic compounds or materials, or the mixtures thereof, are polymerised. This includes low-molecular-weight non-reactive liquid-crystalline compounds, reactive or polymerisable liquid-crystalline compounds, and liquid-crystalline polymers.

A calamitic mesogenic group is usually comprising a mesogenic core consisting of one or more aromatic or non-aromatic cyclic groups connected to each other directly or via linkage groups, optionally comprising terminal groups attached to the ends of the mesogenic core, and optionally comprising one or more lateral groups attached to the long side of the mesogenic core, wherein these terminal and lateral groups are usually selected e.g. from carbyl or hydrocarbyl groups, polar groups like halogen, nitro, hydroxy, etc., or polymerisable groups.

The term "reactive mesogen" means a polymerisable mesogenic or liquid crystal compound, preferably a monomeric compound. These compounds can be used as pure compounds or as mixtures of reactive mesogens with other compounds functioning as photoinitiators, inhibitors, surfactants, stabilizers, chain transfer agents, non-polymerisable compounds, etc.

Polymerisable compounds with one polymerisable group are also referred to as "monoreactive" compounds, compounds with two polymerisable groups as "direactive" compounds, and compounds with more than two polymerisable groups as "multireactive" compounds. Compounds without a polymerisable group are also referred to as "non-reactive or non-polymerisable" compounds.

The term "non-mesogenic compound or material" means a compound or material that does not contain a mesogenic group as defined above.

The term "adhesion promoter" in the sense of the present invention means a compound or material that is used in a polymerisable LC material, e.g. for preparation of an LC polymer film, and significantly improves adhesion of the polymerised LC material or the LC polymer film to a substrate.

Visible light is electromagnetic radiation that has wavelength in a range from about 400 nm to about 740 nm. Ultraviolet (UV) light is electromagnetic radiation with a wavelength in a range from about 200 nm to about 450 nm.

The Irradiance ($E_e$) or radiation power is defined as the power of electromagnetic radiation ($d\theta$) per unit area ($dA$) incident on a surface:

$$E_e = d\theta/dA. \qquad (2)$$

The radiant exposure or radiation dose ($H_e$), is as the irradiance or radiation power ($E_e$) per time (t):

$$H_e = E_e \cdot t. \qquad (3)$$

All temperatures, such as, for example, the melting point T(C,N) or T(C,S), the transition from the smectic (S) to the nematic (N) phase T(S,N) and the clearing point T(N,I) of the liquid crystals, are quoted in degrees Celsius. All temperature differences are quoted in differential degrees.

The term "clearing point" means the temperature at which the transition between the mesophase with the highest temperature range and the isotropic phase occurs.

The term "director" is known in prior art and means the preferred orientation direction of the long molecular axes (in case of calamitic compounds) or short molecular axes (in case of discotic compounds) of the liquid-crystalline or RM molecules. In case of uniaxial ordering of such anisotropic molecules, the director is the axis of anisotropy.

The term "alignment" or "orientation" relates to alignment (orientational ordering) of anisotropic units of material such as small molecules or fragments of big molecules in a common direction named "alignment direction". In an aligned layer of liquid-crystalline or RM material the liquid-crystalline director coincides with the alignment direction so that the alignment direction corresponds to the direction of the anisotropy axis of the material.

The terms "uniform orientation" or "uniform alignment" of an liquid-crystalline or RM material, for example in a layer of the material, mean that the long molecular axes (in case of calamitic compounds) or the short molecular axes (in case of discotic compounds) of the liquid-crystalline or RM molecules are oriented substantially in the same direction. In other words, the lines of liquid-crystalline director are parallel.

The term "homeotropic structure" or "homeotropic orientation" refers to a film wherein the optical axis is substantially perpendicular to the film plane.

The birefringence Δn is defined as follows $$\Delta n = n_e - n_0 \quad (4)$$

wherein $n_e$ is the extraordinary refractive index and $n_0$ is the ordinary refractive index, and the average refractive index $n_{av.}$ is given by the following equation:

$$n_{av.} = ((2n_0^2 + n_e^2)/3)^{1/2} \quad (5)$$

The average refractive index $n_{av.}$ and the ordinary refractive index $n_0$ can be measured using an Abbe refractometer. Δn can then be calculated from the above equations.

In case of doubt the definitions as given in C. Tschierske, G. Pelzl and S. Diele, Angew. Chem. 2004, 116, 6340-6368 shall apply.

DETAILED DESCRIPTION

Typically, the adhesion promoter is dispersed in the polymerisable LC material. In good agreement with the theory it is believed, that the side chain of the (meth)acrylic polymer, which comprises one or more primary amino groups, is capable to chemically interact with the surface of the substrate via a non-covalent interaction.

In a preferred embodiment, the polymerisable LC material comprises one or more (meth)acrylic side chain polymers comprising at least one subunit of formula I,

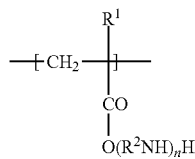

I wherein
$R^1$ denotes —H or —$C_mH_{2m+1}$, preferably H or methyl,
m denotes an integer of 1 to 15,
$R^2$ denotes each and independently and in each occurrence, a linear alkylene group having 1 to 4 carbon atoms, and
n denotes an integer from 1 to 10.

In another preferred embodiment, the polymerisable LC material comprises one or more (meth)acrylic side chain polymers, wherein optionally one or more of the primary amine groups, might have a structure of a primary amine salt such as —$NH_2$.HX, or of an ammonium salt such as —$NH_3^+X^-$, wherein X denotes a halogen atom, respectively. Preferably, X denotes Cl or Br.

In a further preferred embodiment, the polymerisable LC material comprises one or more (meth)acrylic side chain polymers comprising at least one subunit of formula I, wherein $R^2$ denotes methylene or ethylene, preferably ethylene.

The above described (meth)acrylic side chain polymers can be prepared by methods which are known per se and which are described, for example, in standard works of organic chemistry such as, for example, Houben-Weyl, Methoden der organischen Chemie, Thieme-Verlag, Stuttgart.

However, an particularly preferred (meth)acrylic side chain polymer in accordance with the present invention can be obtained by polymerising acrylic acid and/or methacrylic acid in an amount of 5 to 100 mol %, or a mixture of said acrylic acid and/or methacrylic acid, with one or more (meth)acrylic acid esters in an amount of 0 to 95 mol %, followed by a subsequent aminoethylation of the carboxyl groups present in the obtained (meth)acrylic polymer.

Suitable (meth)acrylic acid esters are preferably selected from methyl (meth)acrylate, ethyl (meth)acrylate, propyl (meth)acrylate, n-butyl (meth)acrylate, isobutyl (meth)acrylate, t-butyl (meth)acrylate, hexyl (meth)acrylate, octyl (meth)acrylate, and 2-ethylhexyl (meth)acrylate. Preferably, the (meth)acrylic acid esters are selected from methyl (meth)acrylate, ethyl (meth)acrylate, and/or propyl (meth)acrylate, and/or n-butyl (meth)acrylate.

If in formula I n is 1, the side chain essentially consists of one aminoalkylene group having one terminal primary amino group. If n in formula I is 2 or more, the side chain comprises one or more secondary amino groups in the chain body and one primary amino group at the terminal end of the chain.

The amount of amine hydrogens that are attached to the nitrogen atoms of the above-described (meth)acrylic side chain polymers can be expressed with amine hydrogen equivalent weight (AHEW). The amine hydrogen equivalent weight can be calculated with the following equation (6):

$$AHEW = (S1 * N * S2 * 4000)/(F * V * W) \quad (6)$$

wherein, S1 is the amount of the (meth)acrylic polymer (g), N is the solid content of the (meth)acrylic polymer (% by weight), S2 is amount of diluted the (meth)acrylic polymer solution (g), F is the titer of ¼N-PVSK solution, V is the amount of ¼N-PVSK solution titrated (ml), and W is total weight of diluted sample solution (g). A PVSK solution corresponds to a polyvinyl sulfate calcium solution for colloidal titration, which is commercially available, e.g. from Wako Pure Chemical Industries, Ltd.

In a preferred embodiment of the present invention the polymerisable LC material comprises one or more of the above-described (meth)acrylic side chain polymers having an amine hydrogen equivalent weight in the range from 300 to 2000 g/eq, preferably in the range from 500 to 1900 g/eq, and more preferably in the range from 800 to 1800 g/eq.

The amount of amine hydrogens that are attached to the nitrogen atoms of the above-described (meth)acrylic side chain polymers can also be expressed by the amine value. The amine value is defined as the KOH equivalent to one gram of the (meth)acrylic side chain polymer.

In a further preferred embodiment of the present invention, the polymerisable LC material comprises one or more of the (meth)acrylic side chain polymers having an amine value in the range from 0.1 to 3.0 mmol/g, preferably in the range from 0.3 to 2.0 mmol/g, and more preferably in the range from 0.5 to 1.5 mmol/g.

In a further preferred embodiment of the present invention, the polymerisable LC material comprises one or more of the (meth)acrylic side chain polymers having a weight-average molecular weight of 5,000 to 200,000, preferably 10,000 to 150,000, and more preferably 50,000 to 120,000.

The weight-average molecular weight of the (meth) acrylic side chain polymer can be calculated by a standard polystyrene conversion method with the use of gel permeation chromatography (GPC).

Especially preferred is a polymerisable LC material comprising one or more (meth)acrylic side chain polymers as described above and below, which is preferably selected from the commercially available POLYMENT® series (Shokubai), in particular selected from POLYMENT® NK-380 and/or POLYMENTNK-350.

It was found that additions of small amounts of the above-described adhesion promoter to the polymerisable LC material helped to improve the adhesion of the polymerised LC layer to a substrate, in particular a substrate of TAC, COP or color filter materials, whilst still maintaining the desirable liquid-crystalline properties of the LC material, and whilst exhibiting a uniform homeotropic orientation of the LC molecules in the polymerised film. Thus, the preferred orientation of the of the LC molecules in the polymerised film according to the present invention is homeotropic.

When used, for example, in a liquid crystal display the adhesion promoter can improve the adhesion of the polymerised LC films to the other display components, such as, an alignment layer, electrode layer, color filter, planarization layer, polarizer, compensator, passivation layer, insulting layer, black mask, diffusor, reflector, protective layer, or a PSA (pressure sensitive adhesive) layer e.g. in a stack of films. When used for security or decorative applications, the adhesion promoter can improve the adhesion of the polymerised LC films to the surface of e.g. a document of value or the object to be decorated.

Preferably the minimum amount of adhesion promoter is 0.1%, in particular 0.5%, most preferably 1% by weight of the polymerisable LC material. The maximum amount of adhesion promoter is preferably 10%, very preferably 5%, in particular 3% by weight of the polymerisable LC material.

Suitable polymerisable compounds for the polymerisable LC material according to the present invention are preferably selected from mesogenic or liquid-crystalline compounds. Thus, the polymerisable LC material typically comprises one or more polymerisable chiral or achiral mesogenic or liquid-crystalline compounds.

Polymerisable mesogenic mono-, di-, and multireactive compounds used for the present invention can be prepared by methods which are known per se and which are described, for example, in standard works of organic chemistry such as, for example, Houben-Weyl, Methoden der organischen Chemie, Thieme-Verlag, Stuttgart.

Examples of suitable polymerisable mesogenic compounds that can be used as monomers or co-monomers in a polymerisable LC material according to the present invention, are disclosed for example in WO 93/22397, EP 0 261 712, DE 195 04 224, WO 95/22586, WO 97/00600 and GB 2 351 734. The compounds disclosed in these documents, however, are to be regarded merely as examples that shall not limit the scope of this invention.

A suitable polymerisable LC material in accordance with the present invention comprises one or more polymerisable mono-, di-, or multireactive liquid-crystalline compounds, which are preferably selected from the compound of formula II, $$P\text{-}Sp\text{-}MG\text{-}R^0 \qquad \qquad II$$

wherein

P is a polymerisable group, preferably an acryl, methacryl, vinyl, vinyloxy, propenyl ether, epoxy, oxetane or styrene group, Sp is a spacer group or a single bond, MG is a rod-shaped mesogenic group, which is preferably selected of formula M, M is $-(A^{21}\text{-}Z^{21})_k\text{-}A^{22}\text{-}(Z^{22}\text{-}A^{23})_l\text{-}$, $A^{21}$ to $A^{23}$ are in each occurrence independently of one another an aryl-, heteroaryl-, heterocyclic- or alicyclic group optionally being substituted by one or more identical or different groups L, preferably 1,4-cyclohexylene or 1,4-phenylene, 1,4 pyridine, 1,4-pyrimidine, 2,5-thiophene, 2,6-dithieno[3,2-b:2',3'-d]thiophene, 2,7-fluorine, 2,6-naphtalene, 2,7-phenanthrene optionally being substituted by one or more identical or different groups L, $Z^{21}$ and $Z^{22}$ are in each occurrence independently from each other, —O—, —S—, —CO—, —COO—, —OCO—, —S—CO—, —CO—S—, —O—COO—, —CO—$NR^{01}$—, —$NR^{01}$—CO—$NR^{02}$, —$NR^{01}$—CO—O—, —O—CO—$NR^{01}$—, —OCH$_2$—, —CH$_2$O—, —SCH$_2$—, —CH$_2$S—, —CF$_2$O—, —OCF$_2$—, —CF$_2$S—, —CH$_2$CH$_2$—, —(CH$_2$)$_4$—, —CF$_2$CH$_2$—, —CH$_2$CF$_2$—, —CF$_2$CF$_2$—, —CH═N—, —N═CH—, —N═N—, —CH═CR$^{01}$—, —CY$^{01}$═CY$^{02}$—, —C≡C—, —CH═CH—COO—, —OCO—CH═CH—, or a single bond, preferably —COO—, —COO—, —CO—O—, —O—CO—, —OCH$_2$—, —CH$_2$O—, -, —CH$_2$CH$_2$—, —(CH$_2$)$_4$—, —CF$_2$CH$_2$—, —CH$_2$CF$_2$—, —CF$_2$CF$_2$—, —C≡C—, —CH═CH—COO—, —OCO—CH═CH—, or a single bond, L has one of the meanings as defined above in formula I, R$^0$ is H, alkyl, alkoxy, thioalkyl, alkylcarbonyl, alkoxycarbonyl, alkylcarbonyloxy or alkoxycarbonyloxy with 1 to 20 C atoms more, preferably 1 to 15 C atoms which are optionally fluorinated, or is Y$^0$ or -Sp-P, Y$^0$ is F, Cl, CN, NO$_2$, OCH$_3$, OCN, SCN, optionally fluorinated alkylcarbonyl, alkoxycarbonyl, alkylcarbonyloxy or alkoxycarbonyloxy with 1 to 4 C atoms, or mono-oligo- or polyfluorinated alkyl or alkoxy with 1 to 4 C atoms, preferably F, Cl, CN, NO$_2$, OCH$_3$, or mono- oligo- or polyfluorinated alkyl or alkoxy with 1 to 4 C atoms Y$^{01}$ and Y$^{02}$ have each and independently the meaning as defined above in formula I, R$^{01}$ and R$^{02}$ have each and independently the meaning as defined above in formula I, and k and l are each and independently 0, 1, 2, 3 or 4, preferably 0, 1 or 2, most preferably 1.

Above and below, "carbyl group" denotes a mono- or polyvalent organic group containing at least one carbon atom which either contains no further atoms (such as, for example, —C≡C—) or optionally contains one or more further atoms, such as, for example, N, O, S, P, Si, Se, As, Te or Ge (for example carbonyl, etc.). "Hydrocarbyl group" denotes a carbyl group, which additionally contains one or more H atoms and optionally one or more heteroatoms, such as, for example, N, O, S, P, Si, Se, As, Te or Ge.

"Halogen" denotes F, Cl, Br or I, preferably F.

A carbyl or hydrocarbyl group can be a saturated or unsaturated group. Unsaturated groups are, for example, aryl, alkenyl, or alkinyl groups. A carbyl or hydrocarbyl group having more than 3 C atoms can be straight chain, branched and/or cyclic and may contain spiro links or condensed rings.

Above and below, the terms "alkyl", "aryl", "heteroaryl", etc., also encompass polyvalent groups, for example alkylene, arylene, heteroarylene, etc. The term "aryl" denotes an aromatic carbon group or a group derived therefrom. The term "heteroaryl" denotes "aryl" in accordance with the above definition containing one or more heteroatoms.

Preferred carbyl and hydrocarbyl groups are optionally substituted alkyl, alkenyl, alkinyl, alkoxy, alkylcarbonyl, alkoxycarbonyl, alkylcarbonyloxy and alkoxycarbonyloxy having 1 to 40, preferably 1 to 25, particularly preferably 1 to 18 C atoms, optionally substituted aryl or aryloxy having 6 to 40, preferably 6 to 25 C atoms, or optionally substituted alkylaryl, arylalkyl, alkylaryloxy, arylalkyloxy, arylcarbonyl, aryloxycarbonyl, arylcarbonyloxy and aryloxycarbonyloxy having 6 to 40, preferably 6 to 25 C atoms. Further preferred carbyl and hydrocarbyl groups are $C_1$-$C_{40}$ alkyl, $C_2$-$C_{40}$ alkenyl, $C_2$-$C_{40}$ alkinyl, $C_3$-$C_{40}$ allyl, $C_4$-$C_{40}$ alkyldienyl, $C_4$-$C_{40}$ polyenyl, $C_6$-$C_{40}$ aryl, $C_6$-$C_{40}$ alkylaryl, $C_6$-$C_{40}$ arylalkyl, $C_6$-$C_{40}$ alkylaryloxy, $C_6$-$C_{40}$ aryl-alkyloxy, $C_2$-$C_{40}$ heteroaryl, $C_4$-$C_{40}$ cycloalkyl, $C_4$-$C_{40}$ cycloalkenyl, etc. Particular preference is given to $C_1$-$C_{22}$ alkyl, $C_2$-$C_{22}$ alkenyl, $C_2$-$C_{22}$ alkinyl, $C_3$-$C_{22}$ allyl, $C_4$-$C_{22}$ alkyldienyl, $C_6$-$C_{12}$ aryl, $C_6$-$C_{20}$ arylalkyl, and $C_2$-$C_{20}$ heteroaryl.

Further preferred carbyl and hydrocarbyl groups are straight-chain, branched or cyclic alkyl radicals having 1 to 40, preferably 1 to 25 C atoms, more preferably 1 to 12 C atoms, which are unsubstituted or mono- or polysubstituted by F, Cl, Br, I or CN and in which one or more non-adjacent $CH_2$ groups may each be replaced, independently of one another, by —C($R^x$)=C($R^x$)—, —C≡C—, —N($R^x$)—, —O—, —S—, —CO—, —CO—O—, —O—CO—, —O—CO—O— in such a way that O and/or S atoms are not linked directly to one another.

$R^x$ preferably denotes H, halogen, a straight-chain, branched or cyclic alkyl chain having 1 to 25 C atoms, in which, in addition, one or more non-adjacent C atoms may be replaced by —O—, —S—, —CO—, —CO—O—, —O—CO—, —O—CO—O—, and in which one or more H atoms may be replaced by fluorine, an optionally substituted aryl or aryloxy group having 6 to 40 C atoms or an optionally substituted heteroaryl or heteroaryloxy group having 2 to 40 C atoms.

Preferred alkyl groups are, for example, methyl, ethyl, n-propyl, isopropyl, n-butyl, isobutyl, s-butyl, t-butyl, 2-methylbutyl, n-pentyl, s-pentyl, cyclo-pentyl, n-hexyl, cyclohexyl, 2-ethylhexyl, n-heptyl, cycloheptyl, n-octyl, cyclooctyl, n-nonyl, n-decyl, n-undecyl, n-dodecyl, dodecanyl, trifluoro-methyl, perfluoro-n-butyl, 2,2,2-trifluoroethyl, perfluorooctyl, perfluoro-hexyl, etc.

Preferred alkenyl groups are, for example, ethenyl, propenyl, butenyl, pentenyl, cyclopentenyl, hexenyl, cyclohexenyl, heptenyl, cycloheptenyl, octenyl, cyclooctenyl, etc.

Preferred alkinyl groups are, for example, ethynyl, propynyl, butynyl, pentynyl, hexynyl, octynyl, etc.

Preferred alkoxy groups are, for example, methoxy, ethoxy, 2-methoxy-ethoxy, n-propoxy, i-propoxy, n-butoxy, i-butoxy, s-butoxy, t-butoxy, 2-methylbutoxy, n-pentoxy, n-hexoxy, n-heptyloxy, n-octyloxy, n-nonyloxy, n-decyloxy, n-undecyloxy, n-dodecyloxy, etc.

Preferred amino groups are, for example, dimethylamino, methylamino, methylphenylamino, phenylamino, etc.

Aryl and heteroaryl groups can be monocyclic or polycyclic, i.e. they can have one ring (such as, for example, phenyl) or two or more rings, which may also be fused (such as, for example, naphthyl) or covalently linked (such as, for example, biphenyl), or contain a combination of fused and linked rings. Heteroaryl groups contain one or more heteroatoms, preferably selected from O, N, S, and Se.

Particular preference is given to mono-, bi-, or tricyclic aryl groups having 6 to 25 C atoms and mono-, bi- or tricyclic heteroaryl groups having 2 to 25 C atoms, which optionally contain fused rings and which are optionally substituted. Preference is furthermore given to 5-, 6-, or 7-membered aryl and heteroaryl groups, in which, in addition, one or more CH groups may be replaced by N, S, or O in such a way that O atoms and/or S atoms are not linked directly to one another.

Preferred aryl groups are, for example, phenyl, biphenyl, terphenyl, [1,1':3',1"]terphenyl-2'-yl, naphthyl, anthracene, binaphthyl, phenanthrene, pyrene, dihydropyrene, chrysene, perylene, tetracene, pentacene, benzo-pyrene, fluorene, indene, indenofluorene, spirobifluorene, etc.

Preferred heteroaryl groups are, for example, 5-membered rings, such as pyrrole, pyrazole, imidazole, 1,2,3-triazole, 1,2,4-triazole, tetrazole, furan, thiophene, selenophene, oxazole, isoxazole, 1,2-thiazole, 1,3-thiazole, 1,2,3-oxadiazole, 1,2,4-oxadiazole, 1,2,5-oxadiazole, 1,3,4-oxadiazole, 1,2,3-thiadiazole, 1,2,4-thiadiazole, 1,2,5-thiadiazole, 1,3,4-thiadiazole, 6-membered rings, such as pyridine, pyridazine, pyrimidine, pyrazine, 1,3,5-triazine, 1,2,4-triazine, 1,2,3-triazine, 1,2,4,5-tetrazine, 1,2,3,4-tetrazine, 1,2,3,5-tetrazine, or condensed groups, such as indole, iso-indole, indolizine, indazole, benzimidazole, benzotriazole, purine, naphth-imidazole, phenanthrimidazole, pyridimidazole, pyrazinimidazole, quinoxa-linimidazole, benzoxazole, naphthoxazole, anthroxazole, phenanthroxa-zole, isoxazole, benzothiazole, benzofuran, isobenzofuran, dibenzofuran, quinoline, isoquinoline, pteridine, benzo-5,6-quinoline, benzo-6,7-quinoline, benzo-7,8-quinoline, benzoisoquinoline, acridine, phenothiazine, phenoxazine, benzopyridazine, benzopyrimidine, quinoxaline, phenazine, naphthyridine, azacarbazole, benzocarboline, phenanthridine, phenanthroline, thieno[2,3b]thiophene, thieno[3,2b]thiophene, dithienothiophene, isobenzothiophene, dibenzothiophene, benzothiadiazothiophene, or combinations of these groups. The heteroaryl groups may also be substituted by alkyl, alkoxy, thioalkyl, fluorine, fluoroalkyl or further aryl or heteroaryl groups.

The (non-aromatic) alicyclic and heterocyclic groups encompass both saturated rings, i.e. those that contain exclusively single bonds, and partially unsaturated rings, i.e. those that may also contain multiple bonds. Heterocyclic rings contain one or more heteroatoms, preferably selected from Si, O, N, S, and Se.

The (non-aromatic) alicyclic and heterocyclic groups can be monocyclic, i.e. contain only one ring (such as, for example, cyclohexane), or polycyclic, i.e. contain a plurality of rings (such as, for example, decahydronaphthalene or bicyclooctane). Particular preference is given to saturated groups. Preference is furthermore given to mono-, bi-, or tricyclic groups having 3 to 25 C atoms, which optionally contain fused rings and which are optionally substituted. Preference is furthermore given to 5-, 6-, 7- or 8-membered carbocyclic groups in which, in addition, one or more C atoms may be replaced by Si and/or one or more CH groups may be replaced by N and/or one or more non-adjacent $CH_2$ groups may be replaced by —O— and/or —S—.

Preferred alicyclic and heterocyclic groups are, for example, 5-membered groups, such as cyclopentane, tetrahydrofuran, tetrahydrothiofuran, pyrrolidine, 6-membered groups, such as cyclohexane, silinane, cyclohexene, tetrahydropyran, tetrahydrothiopyran, 1,3-dioxane, 1,3-dithiane, piperidine, 7-membered groups, such as cycloheptane, and fused groups, such as tetrahydronaphthalene, decahydronaphthalene, indane, bicyclo[1.1.1]-pentane-1,3-diyl, bicyclo[2.2.2]octane-1,4-diyl, spiro[3.3]heptane-2,6-diyl, octahydro-4,7-methanoindane-2,5-diyl.

The aryl, heteroaryl, carbyl, and hydrocarbyl radicals optionally have one or more substituents, which are preferably selected from the group comprising silyl, sulfo, sulfonyl, formyl, amine, imine, nitrile, mercapto, nitro, halogen, $C_{1-12}$ alkyl, $C_{6-12}$ aryl, $C_{1-12}$ alkoxy, hydroxyl, or combinations of these groups.

Preferred substituents are, for example, solubility-promoting groups, such as alkyl or alkoxy, electron-withdrawing groups, such as fluorine, nitro or nitrile, or substituents for increasing the glass transition temperature (Tg) in the polymer, in particular bulky groups, such as, for example, t-butyl or optionally substituted aryl groups.

Preferred substituents, also referred to as "L" below, are, for example, F, Cl, Br, I, —OH, —CN, —NO$_2$, —NCO, —NCS, —OCN, —SCN, —C(=O)N(R$^x$)$_2$, —C(=O)Y$^1$, —C(=O)R$^x$, —C(=O)OR$^x$, —N(R$^x$)$_2$, in which R$^x$ has the above-mentioned meaning, and Y$^1$ denotes halogen, optionally substituted silyl, optionally substituted aryl or heteroaryl having 4 to 40, preferably 4 to 20 ring atoms, and straight-chain or branched alkyl, alkenyl, alkinyl, alkoxy, alkylcarbonyl, alkoxycarbonyl, alkylcarbonyloxy or alkoxycarbonyloxy having 1 to 25 C atoms, in which one or more H atoms may optionally be replaced by F or Cl.

"Substituted silyl or aryl" preferably means substituted by halogen, —CN, R$^0$, —OR$^0$, —CO—R$^0$, —CO—O—R$^0$, —O—CO—R$^0$ or —O—CO—O—R$^0$, in which R$^0$ has the above-mentioned meaning.

Particularly preferred substituents L are, for example, F, Cl, CN, NO$_2$, CH$_3$, C$_2$H$_5$, OCH$_3$, OC$_2$H$_5$, COCH$_3$, COC$_2$H$_5$, COOCH$_3$, COOC$_2$H$_5$, CF$_3$, OCF$_3$, OCHF$_2$, OC$_2$F$_5$, furthermore phenyl.

In the formula shown above and below, a substituted phenylene ring

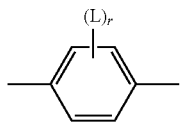

is preferably

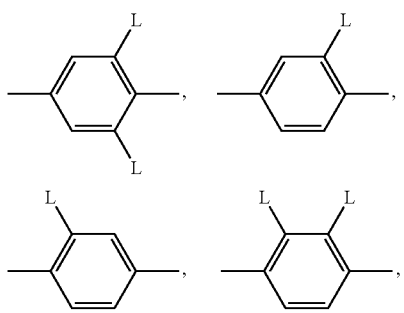

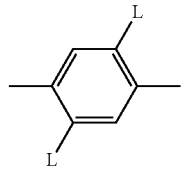

or

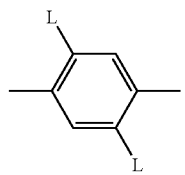

in which L has, on each occurrence identically or differently, one of the meanings given above and below, and is preferably F, Cl, CN, NO$_2$, CH$_3$, C$_2$H$_5$, C(CH$_3$)$_3$, CH(CH$_3$)$_2$, CH$_2$CH(CH$_3$)C$_2$H$_5$, OCH$_3$, OC$_2$H$_5$, COCH$_3$, COC$_2$H$_5$, COOCH$_3$, COOC$_2$H$_5$, CF$_3$, OCF$_3$, OCHF$_2$, OC$_2$F$_5$ or P-Sp-, very preferably F, Cl, CN, CH$_3$, C$_2$H$_5$, OCH$_3$, COCH$_3$, OCF$_3$ or P-Sp-, most preferably F, Cl, CH$_3$, OCH$_3$, COCH$_3$ or OCF$_3$.

The polymerisable group P is preferably selected from groups containing a C=C double bond or C≡C triple bond, and groups which are suitable for polymerisation with ring opening, such as, for example, oxetane or epoxide groups.

Very preferably the polymerisable group P is selected from the group consisting of CH$_2$=CW$^1$—COO—, CH$_2$=CW$^1$—CO—,

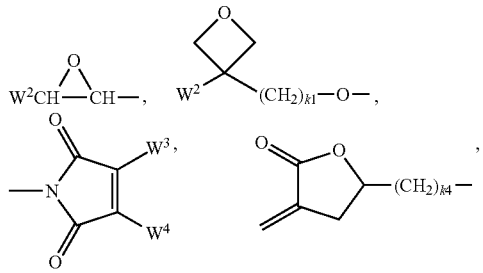

CH$_2$=CW$^2$—(O)$_{k3}$—, CW$^1$=CH—CO—(O)$_{k3}$—, CW$^1$=CH—CO—NH—, CH$_2$=CW$^1$—CO—NH—, CH$_3$—CH=CH—O—, (CH$_2$=CH)$_2$CH—OCO—, (CH$_2$=CH—CH$_2$)$_2$CH—OCO—, (CH$_2$=CH)$_2$CH—O—, (CH$_2$=CH—CH$_2$)$_2$N—, (CH$_2$=CH—CH$_2$)$_2$N—CO—, CH$_2$=CW$^1$—CO—NH—, CH$_2$=CH—(COO)$_{k1}$-Phe-(O)$_{k2}$—, CH$_2$=CH—(CO)$_{k1}$-Phe-(O)$_{k2}$—, Phe-CH=CH—, in which W$^1$ denotes H, F, Cl, CN, CF$_3$, phenyl or alkyl having 1 to 5 C atoms, in particular H, F, Cl or CH$_3$, W$^2$ denotes H or alkyl having 1 to 5 C atoms, in particular H, methyl, ethyl or n-propyl, W$^3$ and W$^4$ each, independently of one another, denote H, Cl or alkyl having 1 to 5 C atoms, Phe denotes 1,4-phenylene, which is optionally substituted by one or more radicals L as being defined above but being different from P-Sp, and k$_1$, k$_2$ and k$_3$ each, independently of one another, denote 0 or 1, k$_3$ preferably denotes 1, and k$_4$ is an integer from 1 to 10.

Particularly preferred groups P are CH$_2$=CH—COO—, CH$_2$=C(CH$_3$)—COO—, CH$_2$=CF—COO—, CH$_2$=CH—, CH$_2$=CH—O—, (CH$_2$=CH)$_2$CH—OCO—, (CH$_2$=CH)$_2$CH—O—,

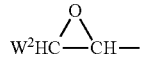

and

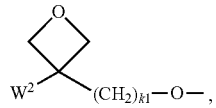

in particular vinyloxy, acrylate, methacrylate, fluoroacrylate, chloroacrylate, oxetane and epoxide, most preferably acrylate or methacrylate.

In a further preferred embodiment of the invention, all polymerisable compounds and sub-formulae thereof contain instead of one or more radicals P-Sp-, one or more branched radicals containing two or more polymerisable groups P (multireactive polymerisable radicals). Suitable radicals of this type, and polymerisable compounds containing them, are described, for example, in U.S. Pat. No. 7,060,200 B1 or US 2006/0172090 A1.

Particular preference is given to multireactive polymerisable radicals selected from the following formulae:

—X-alkyl-CHP$^1$—CH$_2$—CH$_2$P$^2$  I*a

—X-alkyl-C(CH$_2$P$^1$)(CH$_2$P$^2$)—CH$_2$P$^3$  I*b

—X-alkyl-CHP$^1$CHP$^2$—CH$_2$P$^3$  I*c

—X-alkyl-C(CH$_2$P$^1$)(CH$_2$P$^2$)—C$_{aa}$H$_{2aa+1}$  I*d

—X-alkyl-CHP$^1$—CH$_2$P$^2$  I*e

—X-alkyl-CHP$^1$P$^2$  I*f

—X-alkyl-CP$^1$P$^2$—C$_{aa}$H$_{2aa+1}$  I*g

—X-alkyl-C(CH$_2$P$^1$)(CH$_2$P$^2$)—CH$_2$OCH$_2$—C(CH$_2$P$^3$)(CH$_2$P$^4$)CH$_2$P$^5$  I*h —X-alkyl-CH((CH$_2$)$_{aa}$P$^1$)((CH$_2$)$_{bb}$P$^2$)  I*i —X-alkyl-CHP$^1$CHP$^2$—C$_{aa}$H$_{2aa+1}$  I*k in which
alkyl denotes a single bond or straight-chain or branched alkylene having 1 to 12 C atoms, in which one or more non-adjacent CH$_2$ groups may each be replaced, independently of one another, by —C(R$^x$)=C(R$^x$)—, —C≡C—, —N(R$^x$)—, —O—, —S—, —CO—, —CO—O—, —O—CO—, —O—CO—O— in such a way that O and/or S atoms are not linked directly to one another, and in which, in addition, one or more H atoms may be replaced by F, Cl or CN, where R$^x$ has the above-mentioned meaning and preferably denotes R$^0$ as defined above,
aa and bb each, independently of one another, denote 0, 1, 2, 3, 4, 5 or 6, X has one of the meanings indicated for X', and
P$^{1-5}$ each, independently of one another, have one of the meanings indicated above for P.

Preferred spacer groups Sp are selected from the formula Sp'-X', so that the radical "P-Sp-" conforms to the formula "P-Sp'-X'-", where Sp' denotes alkylene having 1 to 20, preferably 1 to 12 C atoms, which is optionally mono- or polysubstituted by F, Cl, Br, I or CN and in which, in addition, one or more non-adjacent CH$_2$ groups may each be replaced, independently of one another, by —O—, —S—, —NH—, —NR$^{01}$—, —SiR$^{01}$R$^{02}$—, —CO—, —COO—, —COO—, —COO—O—, —S—CO—, —CO—S—, —NR$^{01}$—CO—O—, —O—CO—NR$^{01}$—, —NR$^{01}$—CO—NR$^{01}$—, —CH=CH— or —C≡C— in such a way that O and/or S atoms are not linked directly to one another, X' denotes —O—, —S—, —CO—, —COO—, —OCO—, —O—COO—, —CO—NR$^{01}$—, —NR$^{01}$—CO—, —NR$^{01}$—CO—NR$^{01}$—, —OCH$_2$—, —CH$_2$O—, —SCH$_2$—, —CH$_2$S—, —CF$_2$O—, —OCF$_2$—, —CF$_2$S—, —SCF$_2$—, —CF$_2$CH$_2$—, —CH$_2$CF$_2$—, —CF$_2$CF$_2$—, —CH=N—, —N=CH—, —N=N—, —CH=CR$^{01}$—, —CY$^{01}$=CY$^{02}$—, —C≡C—, —CH=CH—COO—, —OCO—CH=CH— or a single bond, R$^{01}$ and R$^{02}$ each, independently of one another, denote H or alkyl having 1 to 12 C atoms, and Y$^{01}$ and Y$^{02}$ each, independently of one another, denote H, F, Cl or CN.

X' is preferably —O—, —S— —CO—, —COO—, —OCO—, —O—COO—, —CO—NR$^0$—, —NR$^{01}$—CO—, —NR$^{01}$—CO—NR$^{01}$— or a single bond.

Typical spacer groups Sp' are, for example, —(CH$_2$)$_{p1}$—, —(CH$_2$CH$_2$O)$_{q1}$—CH$_2$CH$_2$—, —CH$_2$CH$_2$—S—CH$_2$CH$_2$—, —CH$_2$CH$_2$—NH—CH$_2$CH$_2$— or —(SiR$^{01}$R$^{02}$—O)$_{p1}$—, in which p1 is an integer from 1 to 12, q1 is an integer from 1 to 3, and R$^{01}$ and R$^{02}$ have the above-mentioned meanings.

Particularly preferred groups —X'-Sp'- are —(CH$_2$)$_{p1}$—, —O—(CH$_2$)$_{p1}$—, —COO—(CH$_2$)$_{p1}$—, —OCOO—(CH$_2$)$_{p1}$—.

Particularly preferred groups Sp' are, for example, in each case straight-chain ethylene, propylene, butylene, pentylene, hexylene, heptylene, octylene, nonylene, decylene, undecylene, dodecylene, octadecylene, ethyleneoxyethylene, methyleneoxybutylene, ethylenethioethylene, ethyl-ene-N-methyliminoethylene, 1-methylalkylene, ethenylene, propenylene and butenylene.

Preferred polymerisable polymerisable mono-, di-, or multireactive liquid-crystalline compounds are disclosed for example in WO 93/22397, EP 0 261 712, DE 195 04 224, WO 95/22586, WO 97/00600, U.S. Pat. No. 5,518,652, U.S. Pat. No. 5,750,051, U.S. Pat. No. 5,770,107 and U.S. Pat. No. 6,514,578.

Further preferred polymerisable mono-, di-, or multireactive liquid-crystalline compounds are shown in the following list:

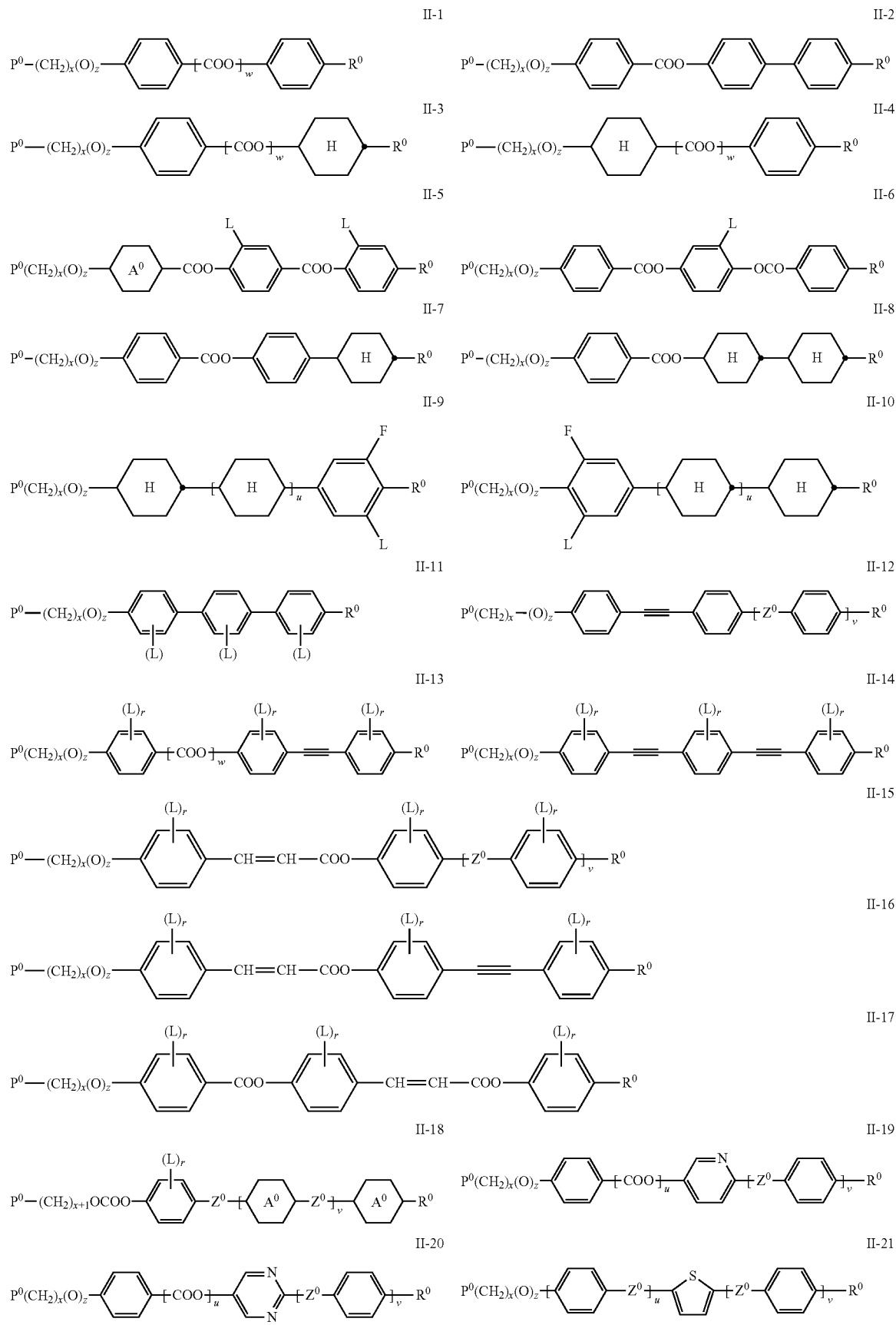

-continued
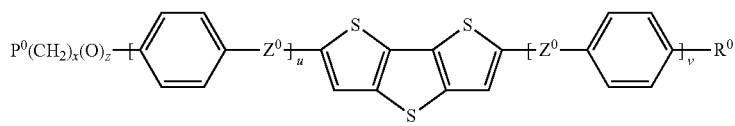
II-22
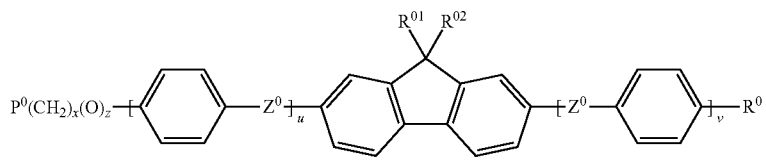
II-23
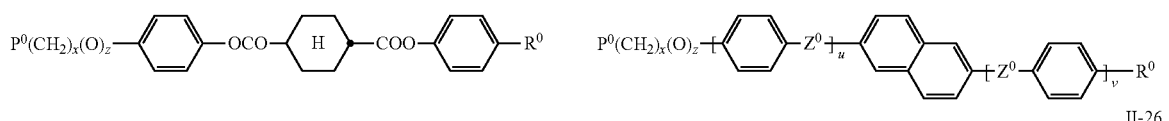
II-24     II-25
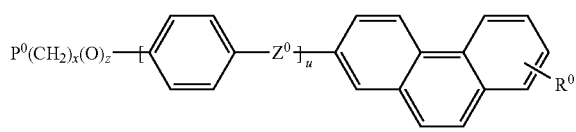
II-26
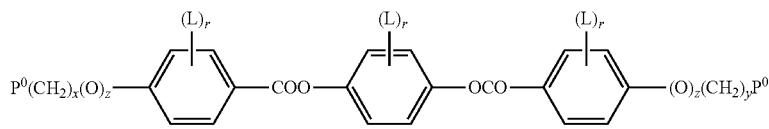
II-27
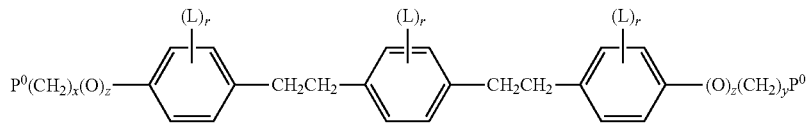
II-28
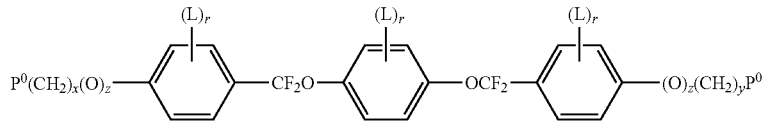
II-29
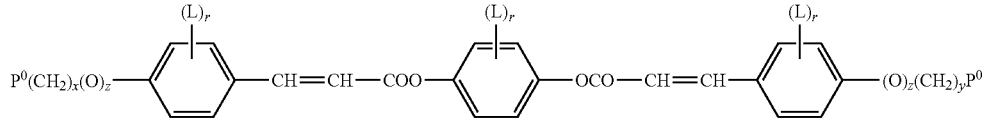
II-30
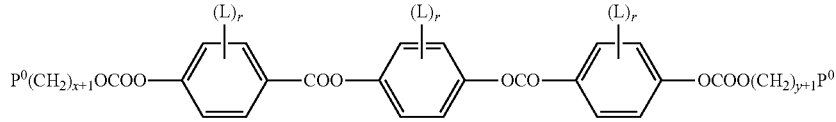
II-31
II-32
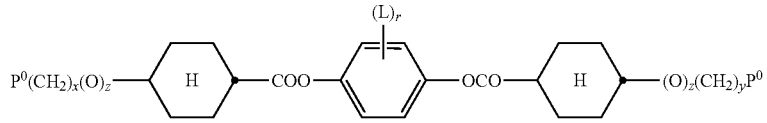
II-33
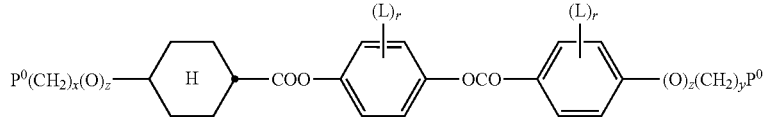
II-34 wherein
P⁰ is, in case of multiple occurrence independently of one another, a polymerisable group, preferably an acryl, methacryl, oxetane, epoxy, vinyl, vinyloxy, propenyl ether or styrene group,
A⁰ is, in case of multiple occurrence independently of one another, 1,4-phenylene that is optionally substituted with 1, 2, 3 or 4 groups L, or trans-1,4-cyclohexylene,
Z⁰ is, in case of multiple occurrence independently of one another, —COO—, —COO—, —CH$_2$CH$_2$—, —C≡C—, —CH=CH—, —CH=CH—COO—, —OCO—CH=CH— or a single bond,
r is 0, 1, 2, 3 or 4, preferably 0, 1 or 2,
t is, in case of multiple occurrence independently of one another, 0, 1, 2 or 3,
u and v are independently of each other 0, 1 or 2,
w is 0 or 1,
x and y are independently of each other 0 or identical or different integers from 1 to 12,
z is 0 or 1, with z being 0 if the adjacent x or y is 0,
in addition, wherein the benzene and naphthalene rings can additionally be substituted with one or more identical or different groups L.

The parameter R⁰, Y⁰, R⁰¹, R⁰² and L have the same meanings as given above in formula II.

The proportion of said mono-, di- or multireactive liquid-crystalline compounds in a preferred LC material used for the method according to the present invention as a whole, is preferably in the range from 30 to 99.9% by weight, more preferably in the range from 40 to 99.9% by weight and even more preferably in the range from 50 to 99.9% by weight.

The polymerisable LC material is preferably a mixture comprising one or more polymerisable compounds having one polymerisable group (monoreactive) and one or more polymerisable compound having two or more polymerisable groups (di- or multireactive).

In another preferred embodiment the polymerisable LC material used for the preparation of the low crosslinked film does not contain compounds having more than two polymerisable groups.

In another preferred embodiment the polymerisable LC material used for the preparation of the low cross-linked film is an achiral material, i.e. it does not contain chiral compounds.

The polymerisable compounds and polymerisable mesogenic compounds referred to above and below are preferably monomers.

Preferably, the polymerisable LC materials according to the present invention, may also comprise one or more photoinitiators for radical polymerisation for example the commercially available Irgacure® or Darocure® series (all from Ciba Geigy AG) can be used, whereas in case of cationic photopolymerisation the commercially available UVI 6974 (Union Carbide) can be used.

More preferably, the polymerisable LC material according to the present invention, may also comprise one or more dyes having an absorption maximum adjusted to the wavelength of the radiation used for polymerisation, in particular UV dyes like e.g. 4,4"-azoxy anisole or Tinuvin® dyes (from Ciba AG).

The polymerisable LC material in accordance with the present invention may also comprises one or more stabilizers or inhibitors to prevent undesired spontaneous polymerisation, preferably in an amount of 0 to 0.1%, very preferably 0 to 0.2%, for example selected from the commercially available Irganox® series (Ciba AG), like Irganox 1076.

In a preferred embodiment, the polymerisable LC material according to the present invention comprises one or more monoreactive polymerisable non-mesogenic compounds, preferably in an amount of 0 to 50%, very preferably 0 to 20%. Typical examples are alkylacrylates or alkylmethacrylates, preferably isobornyl methacrylate.

In another preferred embodiment, the polymerisable LC material optionally comprises one or more di-, or multireactive polymerisable non-mesogenic compounds in order to modify the birefringence of the polymer film, preferably in an amount of 0 to 50%, very preferably 0 to 20%, alternatively or in addition to the di-, or multireactive polymerisable mesogenic compounds. Typical examples of direactive monomers are alkyldiacrylates or alkyldimethacrylates with alkyl groups of 1 to 20 C atoms or hexanediol diacrylate. Typical examples of multireactive monomers are trimethylpropanetrimethacrylate, or pentaerythritoltetraacrylate.

The polymerisable LC material used in accordance with the present invention may also comprise one or more surfactants, which are commonly known to the expert. Preferably in an amount of 0 to 3% by weight, more preferably 0 to 2% by weight, even more preferably 0.1 to 1% by weight, in particular selected from the commercially available surfactants TegoRad 2500 (Evonik), or FluorN 561 or 562 (Cytonix) or n-dodecanol.

It is also possible to add one or more chain transfer agents to the polymerisable LC material in order to modify the physical properties of the polymer film. Especially preferred are thiol compounds, for example monoreactive thiols like dodecane thiol or multireactive thiols like trimethylpropane tri(3-mercaptopropionate). Very preferred are mesogenic or liquid-crystalline thiols as disclosed for example in WO 96/12209, WO 96/25470, or U.S. Pat. No. 6,420,001. By using chain transfer agents the length of the free polymer chains and/or the length of the polymer chains between two crosslinks in the polymer film can be controlled. When the amount of the chain transfer agent is increased, the polymer chain length in the polymer film decreases.

The polymerisable LC material in accordance with the present invention may also comprise a polymeric binder or one or more monomers capable of forming a polymeric binder, and/or one or more dispersion auxiliaries. Suitable binders and dispersion auxiliaries are disclosed for example in WO 96/02597. Preferably, however, the polymerisable material does not contain a binder or dispersion auxiliary.

In another preferred embodiment, the polymerisable LC material can additionally comprise one or more additional components like for example catalysts, sensitizers, stabilizers, inhibitors, chain-transfer agents, co-reacting monomers, lubricating agents, wetting agents, dispersing agents, hydrophobing agents, adhesive agents, flow improvers, defoaming agents, deaerators, diluents, reactive diluents, auxiliaries, colourants, dyes or pigments.

Preferably, the polymerisable LC material comprises,
a) one or more mono-, di- or multireactive polymerisable mesogenic compounds,
b) one or more adhesion promoters selected from a (meth)acrylic side chain polymer comprising one or more primary amino groups in the side chain,
c) one or more photoinitiators,
d) optionally one or more surfactants,
e) optionally one or more stabilizers,
f) optionally one or more mono-, di- or multireactive polymerisable non-mesogenic compounds,
g) optionally one or more dyes showing an absorption maximum at the wavelength used to initiate photo polymerisation, h) optionally one or more chain transfer agents,
i) optionally one or more stabilizers.

More preferably, the polymerisable LC material comprises,
a) one or more monoreactive polymerisable mesogenic compounds, preferably in an amount of 30 to 95% by weight, very preferably 50 to 90%, preferably selected from the compounds of formulae II-1 and/or II-7,
b) one or more di- or multireactive polymerisable mesogenic compounds, preferably in an amount of 20 to 60% by weight, very preferably 25 to 55% by weight preferably selected from the compounds of formula II6 and/or II-7,
c) one or more adhesion promoters, preferably in an amount of 0.1 to 3% by weight, very preferably 0.1 to 1% by weight, preferably selected from NK-380 and/or NK-350,
d) optionally one or more photoinitiators, preferably in an amount of 3 to 20% by weight, very preferably 5 to 15% by weight,
e) optionally one or more surfactants, and
f) optionally one or more stabilizers.

The invention further relates to a method of preparing a polymer film by
providing a layer of a polymerisable LC material as described above and below onto a substrate,
polymerising the polymerisable LC material, and
optionally removing the polymerised LC material from the substrate and/or optionally providing it onto another substrate.

It is also possible to dissolve the polymerisable LC material in a suitable solvent. This solution is then coated or printed onto the substrate, for example by spin-coating, printing, or other known techniques, and the solvent is evaporated off before polymerisation. In most cases, it is suitable to heat the mixture in order to facilitate the evaporation of the solvent. As solvents, for example standard organic solvents can be used. The solvents can be selected for example from ketones such as acetone, methyl ethyl ketone, methyl propyl ketone or cyclohexanone; acetates such as methyl, ethyl or butyl acetate or methyl acetoacetate; alcohols such as methanol, ethanol or isopropyl alcohol; aromatic solvents such as toluene or xylene; halogenated hydrocarbons such as di- or trichloromethane; glycols or their esters such as PGMEA (propyl glycol monomethyl ether acetate), γ-butyrolactone, and the like. It is also possible to use binary, ternary, or higher mixtures of the above solvents.

The polymerisable LC material can be applied onto a substrate by conventional coating techniques like spin coating, bar coating or blade coating. It can also be applied to the substrate by conventional printing techniques which are known to the expert, like for example screen printing, offset printing, reel-to-reel printing, letter press printing, gravure printing, rotogravure printing, flexographic printing, intaglio printing, pad printing, heat-seal printing, ink-jet printing or printing by means of a stamp or printing plate.

Suitable plastic substrates are known to the expert and described in the literature, as for example conventional substrates used in the optical films industry. Especially suitable and preferred substrates for polymerisation are polyester such as polyethyleneterephthalate (PET) or polyethylenenaphthalate (PEN), polyvinylalcohol (PVA), polycarbonate (PC) triacetylcellulose (TAC), or cyclo olefin polymers (COP), or commonly known color filter materials, in particular triacetylcellulose (TAC), cyclo olefin polymers (COP), or commonly known color filter materials.

The polymer films are preferably prepared from the polymerisable LC material by in-situ polymerisation. In a preferred method of preparation the polymerisable LC material is coated onto a substrate and subsequently polymerised for example by exposure to heat or actinic radiation as described for example in WO 01/20394, GB 2,315,072 or WO 98/04651.

Polymerisation of the LC material is preferably achieved by exposing it to actinic radiation. Actinic radiation means irradiation with light, like UV light, IR light or visible light, irradiation with X-rays or gamma rays, or irradiation with high-energy particles, such as ions or electrons. Preferably, polymerisation is carried out by photo irradiation, in particular with UV light. As a source for actinic radiation, for example a single UV lamp or a set of UV lamps can be used. When using a high lamp power the curing time can be reduced. Another possible source for photo radiation is a laser, like e.g. a UV laser, an IR laser, or a visible laser.

The curing time is dependent, inter alia, on the reactivity of the polymerisable LC material, the thickness of the coated layer, the type of polymerisation initiator and the power of the UV lamp. The curing time is preferably 5 minutes, very preferably 3 minutes, most preferably 1 minute. For mass production, short curing times of 30 seconds are preferred.

A suitable UV radiation power is preferably in the range from 5 to 200 mWcm-2, more preferably in the range from 50 to 175 mWcm-2 and most preferably in the range from 100 to 150 mWcm-2.

In connection with the applied UV radiation and as a function of time, a suitable UV dose is preferably in the range from 25 to 7200 mJcm-2 more preferably in the range from 500 to 7200 mJcm-2 and most preferably in the range from 3000 to 7200 mJcm-2.

Polymerisation is carried out in the presence of an initiator absorbing at the wavelength of the actinic radiation. For example, when polymerising by means of UV light, a photoinitiator can be used that decomposes under UV irradiation to produce free radicals or ions that start the polymerisation reaction. UV photoinitiators are preferred, in particular radicalic UV photoinitiators.

Polymerisation is preferably performed under an inert gas atmosphere, preferably in a heated nitrogen atmosphere, but also polymerisation in air is possible.

Polymerisation is preferably performed at a temperature from 1 to 70° C., more preferably 5 to 50° C., even more preferably 15 to 30° C.

The polymerised LC film according to the present invention has good adhesion to plastic substrates, in particular to TAC, COP, and colour filters. Accordingly, it can be used as adhesive or base coating for subsequent LC layers which otherwise would not well adhere to the substrates.

The preferred thickness of a polymerised LC film according to the present invention is determined by the optical properties desired from the film or the final product. For example, if the polymerised LC film does not mainly act as an optical layer, but e.g. as adhesive, aligning or protection layer, its thickness is preferably not greater than 1 μm, in particular not greater than 0.5 μm, very preferably not greater than 0.2 μm.

For optical applications of the polymer film, it preferably has a thickness of from 0.5 to 10 μm, very preferably from 1 to 5 μm, in particular from 1 to 3 μm.

The optical retardation (δ(λ)) of a polymer film as a function of the wavelength of the incident beam (λ) is given by the following equation (7):

$$\delta(\lambda) = (2\pi \Delta n \cdot d)/\lambda \tag{7}$$

wherein (Δn) is the birefringence of the film, (d) is the thickness of the film and λ is the wavelength of the incident beam.

According to Snellius law, the birefringence as a function of the direction of the incident beam is defined as $$\Delta n = \sin \Theta / \sin \Psi \tag{8}$$

wherein sin Θ is the incidence angle or the tilt angle of the optical axis in the film and sin Ψ is the corresponding reflection angle.

Based on these laws, the birefringence and accordingly optical retardation depends on the thickness of a film and the tilt angle of optical axis in the film (cf. Berek's compensator). Therefore, the skilled expert is aware that different optical retardations or different birefringence can be induced by adjusting the orientation of the liquid-crystalline molecules in the polymer film.

The birefringence (Δn) of the polymer film according to the present invention is preferably in the range from 0.01 to 0.30, more preferable in the range from 0.01 to 0.25 and even more preferable in the range from 0.01 to 0.16.

The optical retardation as a function of the thickness of the polymer film obtained by the method according to the present invention is less than 200 nm, preferable less than 180 nm and even more preferable less than 150 nm.

The homeotropic aligned polymer films of the present invention can be used as retardation or compensation film for example in LCDs to improve the contrast and brightness at large viewing angles and reduce the chromaticity. They can be used outside the switchable liquid-crystalline cell in an LCD, or between the substrates, usually glass substrates, forming the switchable liquid-crystalline cell and containing the switchable liquid-crystalline medium (in cell application).

Especially with regard to the in cell application, the polymer films according to the present invention exhibit a high temperature stability. Thus, the polymer films exhibit temperature stability up to 300° C., preferably up to 250° C., more preferably up to 230° C.

The polymer film of the present invention can also be used as alignment film for other liquid-crystalline or RM materials. For example, they can be used in an LCD to induce or improve alignment of the switchable liquid-crystalline medium, or to align a subsequent layer of polymerisable LC material coated thereon. In this way, stacks of polymerised LC films can be prepared.

In summary, the polymerised LC films and polymerisable LC materials according to the present invention are useful in optical elements like polarisers, compensators, alignment layer, circular polarisers or colour filters in liquid crystal displays or projection systems, decorative images, for the preparation of liquid crystal or effect pigments, and especially in reflective films with spatially varying reflection colours, e.g. as multicolour image for decorative, information storage or security uses, such as non-forgeable documents like identity or credit cards, banknotes etc.

The polymerised LC films according to the present invention can be used in displays of the transmissive or reflective type. They can be used in conventional LCDs, in particular those of the DAP (deformation of aligned phases) or VA (vertically aligned) mode, like e.g. ECB (electrically controlled birefringence), CSH (colour super homeotropic), VAN or VAC (vertically aligned nematic or cholesteric) displays, MVA (multi-domain vertically aligned) or PVA (patterned vertically aligned) displays, in displays of the bend mode or hybrid type displays, like e.g. OCB (optically compensated bend cell or optically compensated birefringence), R-OCB (reflective OCB), HAN (hybrid aligned nematic) or pi-cell (π-cell) displays, furthermore in displays of the TN (twisted nematic), HTN (highly twisted nematic) or STN (super twisted nematic) mode, in AMD-TN (active matrix driven TN) displays, or in displays of the IPS (in plane switching) mode which are also known as 'super TFT' displays. Especially preferred are VA, MVA, PVA, OCB, and pi-cell displays.

The polymerisable material and polymer films according to the present invention are especially useful for a 3D display as described in EP 0 829 744, EP 0 887 666 A2, EP 0 887 692, U.S. Pat. No. 6,046,849, U.S. Pat. No. 6,437,915 and in "Proceedings o the SID 20$^{th}$ International Display Research Conference, 2000", page 280. A 3D display of this type comprising a polymer film according to the invention is another object of the present invention.

The present invention is described above and below with particular reference to the preferred embodiments. It should be understood that various changes and modifications might be made therein without departing from the spirit and scope of the invention.

Many of the compounds or mixtures thereof mentioned above and below are commercially available. All of these compounds are either known or can be prepared by methods which are known per se, as described in the literature (for example in the standard works such as Houben-Weyl, Methoden der Organischen Chemie [Methods of Organic Chemistry], Georg-Thieme-Verlag, Stuttgart), to be precise under reaction conditions which are known and suitable for said reactions. Use may also be made here of variants which are known per se, but are not mentioned here. Unless the context clearly indicates otherwise, as used herein plural forms of the terms herein are to be construed as including the singular form and vice versa.

Throughout this application, unless explicitly stated otherwise, all concentrations are given in weight percent and relate to the respective complete mixture, all temperatures are given in degrees centigrade (Celsius) and all differences of temperatures in degrees centigrade. All physical properties have been and are determined according to "Merck Liquid Crystals, Physical Properties of Liquid Crystals", Status November 1997, Merck KGaA, Germany and are given for a temperature of 20° C., unless explicitly stated otherwise. The optical anisotropy (Δn) is determined at a wavelength of 589.3 nm.

Throughout the description and claims of this specification, the words "comprise" and "contain" and variations of the words, for example "comprising" and "comprises", mean "including but not limited to", and are not intended to (and do not) exclude other components. On the other hand, the word "comprise" also encompasses the term "consisting of" but is not limited to it.

Throughout the description and claims of this specification, the words "obtainable" and "obtained" and variations of the words, mean "including but not limited to", and are not intended to (and do not) exclude other components. On the other hand, the word "obtainable" also encompasses the term "obtained" but is not limited to it.

It will be appreciated that variations to the foregoing embodiments of the invention can be made while still falling within the scope of the invention. Alternative features serving the same, equivalent, or similar purpose may replace each feature disclosed in this specification, unless stated otherwise. Thus, unless stated otherwise, each feature disclosed is one example only of a generic series of equivalent or similar features.

All of the features disclosed in this specification may be combined in any combination, except combinations where at least some of such features and/or steps are mutually exclusive. In particular, the preferred features of the invention are applicable to all aspects of the invention and may be used in any combination. Likewise, features described in non-essential combinations may be used separately (not in combination).

It will be appreciated that many of the features described above, particularly of the preferred embodiments, are inventive in their own right and not just as part of an embodiment of the present invention. Independent protection may be sought for these features in addition to or alternative to any invention presently claimed.

The invention will now be described in more detail by reference to the following working examples, which are illustrative only and do not limit the scope of the invention.

The examples below serve to illustrate the invention without limiting it. In the foregoing and the following, all temperatures are given in degrees Celsius, and all percentages are by weight, unless stated otherwise.

EXAMPLES

Example 1

The polymerisable LC mixture M1 was formulated as follows
M1:

| | |
|---|---|
| (1) | 20.99% |
| (2) | 18.66% |
| (3) | 32.66% |
| (4) | 20.99% |
| Dodecanol | 1.020% |
| Irgacure 907 | 1.00% |
| Irganox 1076 | 0.08% |

Irgacure651® is a photoinitiator, Irganox1076® a stabilizer, both being commercially available (Ciba AG, Basel, Switzerland).

Alignment and Adhesion on a TAC Substrate

M1 is dissolved in PGMEA (propylene glycol mono methyl ether acetate) at a concentration of 30%.

NK-380 is added in 1% by weight of M1 to the solution. The resulting solution is spin coated (2,000 RPM; 30 s) onto TAC and photopolymerised (20 mWcm$^{-2}$, 60 s, N$_2$). The mixture gives a clear, transparent polymer film with good orientation.

The adhesion of the film to the substrate is tested using the Scotch #610 tape test. The 610 tape is thereby applied over the polymer film and removed sharply. The adhesion is deemed to pass if the film was not removed. Each film is tested 5 times. The result of the Scotch #610 tape test show that adding NK-380 to M1, promotes adhesion between the polymerised LC layer and the substrate, whilst giving a clear, transparent, highly oriented film.

Alignment on a Color Filter

M1 is dissolved in PGMEA (propylene glycol mono methyl ether acetate) at a concentration of 30%.

NK-380 is added in 1% by weight of M1 to the solution. The resulting solution is spin coated (2,000 RPM; 30 s) onto a color filter and photopolymerised (20 mWcm$^{-2}$, 60 s, N$_2$). The mixture gives a clear, transparent polymer film with good orientation.

Temperature Stability

M1 is dissolved in PGMEA (propylene glycol mono methyl ether acetate) at a concentration of 30%.

NK-380 is added in 1% by weight of M1 to the solution. The resulting solution is spin coated (2,000 RPM; 30 s) onto a cleaned glass substrate and photopolymerised (20 mWcm$^{-2}$, 60 s, N$_2$). The mixture gives a clear, transparent polymer film with good orientation.

After heating the sample up to 230° C. for three hours, the films show still a good uniform alignment without cracks.

Comparative Example 1

Alignment and Adhesion on a TAC Substrate

M1 is dissolved in PGMEA (propylene glycol mono methyl ether acetate) at a concentration of 30%.

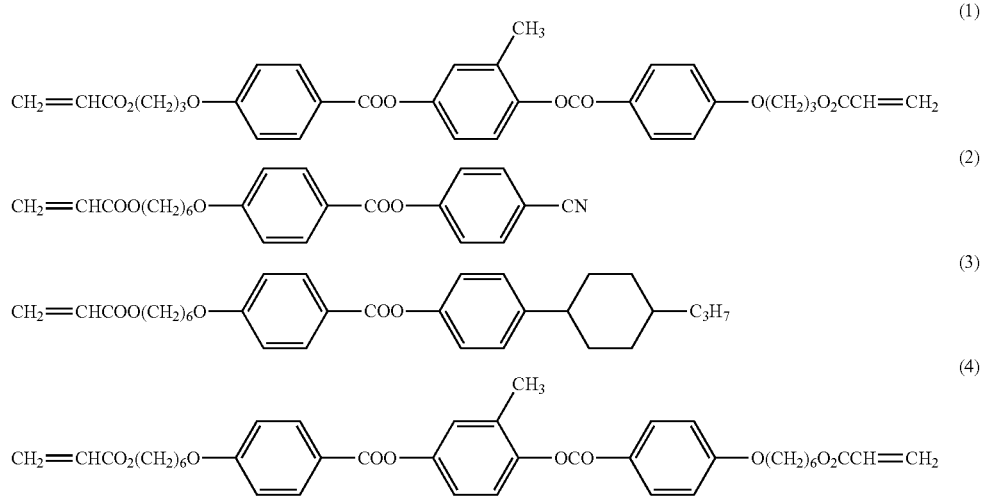

The resulting solution is spin coated (2,000 RPM; 30 s) onto TAC and photopolymerised (20 mWcm$^{-2}$, 60 s, N$_2$). The mixture gives only a hazy polymer film.

The adhesion of the film to the substrate is tested using the Scotch #610 tape test. The 610 tape is thereby applied over the polymer film and removed sharply. The adhesion is deemed to pass if the film was not removed. Each film is tested 5 times. The result of the Scotch #610 tape test show that without adding NK-380 to M1, the adhesion between the polymerised LC layer and the TAC substrate is poor Alignment on a Color Filter M1 is dissolved in PGMEA (propylene glycol mono methyl ether acetate) at a concentration of 30%.

The resulting solution is spin coated (2,000 RPM; 30 s) onto a color filter and photopolymerised (20 mWcm$^{-2}$, 60 s, N$_2$). The mixture gives a poorly aligned polymer film.

Temperature Stability

M1 is dissolved in PGMEA (propylene glycol mono methyl ether acetate) at a concentration of 30%.

The resulting solution is spin coated (2,000 RPM; 30 s) onto a cleaned glass substrate and photopolymerised (20 mWcm$^{-2}$, 60 s, N$_2$). The mixture gives a clear, transparent polymer films with good orientation.

After heating the sample up to 230° C. for three hours, the film show many cracks.

Example 2

The polymerisable LC mixture M2 was formulated as follows

M2:

|     |     |
| --- | --- |
| (1) | 21.21% |
| (2) | 18.85% |
| (3) | 33.00% |
| (4) | 21.20% |
| Irgacure 907 | 5.66% |
| Irganox 1076 | 0.08% |

M2 is dissolved in PGMEA (propylene glycol mono methyl ether acetate) at a concentration of 30%.

Alignment and Adhesion on a TAC Substrate

NK-380 is added in 1% by weight of M2 to the solution. The resulting solution is spin coated (2,000 RPM; 30 s) onto TAC and photopolymerised (20 mWcm$^{-2}$, 60 s, N$_2$).

The mixture gives a clear, transparent polymer film with good orientation.

The adhesion of the film to the substrate is tested using the Scotch #610 tape test. The 610 tape is thereby applied over the polymer film and removed sharply. The adhesion is deemed to pass if the film was not removed. Each film is tested 5 times.

The result of the Scotch #610 tape test show that adding NK-380 to M2, promotes adhesion between the polymerised LC layer and the substrate, whilst giving clear, transparent, highly oriented film.

The invention claimed is:

1. Polymerisable liquid crystal (LC) material comprising a mixture of:
   one or more polymerisable mesogenic compounds including one or more mono-, di- or multi-reactive compound of the formula II:

P-Sp-MG-R$^0$  II wherein
   P is a polymerisable group,
   Sp is a spacer group or a single bond,
   MG is a rod-shaped mesogenic group,
   R$^0$ is H, alkyl, alkoxy, thioalkyl, alkylcarbonyl, alkoxycarbonyl, alkylcarbonyloxy or alkoxycarbonyloxy with 1 to 20 C atoms more, or is Y$^0$ or -Sp-P, and
   Y$^0$ is F, Cl, CN, NO$_2$, OCH$_3$, OCN, SCN, optionally fluorinated alkylcarbonyl, alkoxycarbonyl, alkylcarbonyloxy or alkoxycarbonyloxy with 1 to 4 C atoms, or mono- oligo- or polyfluorinated alkyl or alkoxy with 1 to 4 C atoms;
   and at least one adhesion promoter, wherein the at least one adhesion promoter is selected from a (meth)acrylic side chain polymer comprising at least one subunit of formula I,

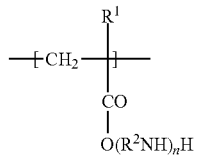

wherein
R$^1$ denotes —H or —C$_m$H$_{2m+1}$,
m denotes an integer of 1 to 15,
R$^2$ denotes each and independently and in each occurrence, a linear alkylene group having 1 to 4 carbon atoms, and
n denotes an integer from 2 to 10.

2. Polymerisable LC material according to claim 1, wherein the adhesion promoter is selected from a (meth) acrylic polymer comprising a recurring unit of formula I, wherein R$^2$ denotes methylene or ethylene.

3. Polymerisable LC material according to claim 1, wherein the adhesion promoter has an amine hydrogen equivalent weight in the range from 300 to 2000 g/eq.

4. Polymerisable LC material according to claim 1, wherein the adhesion promoter has an amine value in the range from 0.1 to 3.0 mmol/g.

5. Polymerisable LC material according to claim 1, wherein the one or more polymerisable mesogenic compounds are selected from one or more mono-, di- and/or multireactive polymerisable mesogenic compounds.

6. A polymer film comprising the polymerisable LC material according to claim 1.

7. Polymer film according to claim 6, wherein the polymerisable LC material is homeotropically aligned.

8. Polymer film according to claim 6, wherein the polymer film is obtained by the following steps
   providing a layer of the polymerisable LC material onto a substrate,
   polymerising the LC material, and
   optionally, removing the polymerised LC material from the substrate and/or optionally providing it the polymerised LC material onto another substrate.

9. An optical, electrooptical, information storage, decorative or security application, liquid crystal display, 3D display, projection system, polariser, compensator, alignment layer, circular polariser, colour filter, decorative image, liquid crystal pigment, reflective film with spatially varying reflection colours, multicolour image, non-forgeable document, identity or credit card or banknote, which comprises a polymerizable LC material wherein the polymerizable LC material is according to claim 1.

10. A component or device which is: an optical component or device, polariser, patterned retarder, compensator, alignment layer, circular polariser, colour filter, decorative image, liquid crystal lens, liquid crystal pigment, reflective film with spatially varying reflection colours or multicolour image for decorative or information storage, comprising at least one polymer film, wherein the at least one polymer film is according to claim 6.

11. Liquid crystal display comprising a polymerizable LC material wherein the polymerizable LC material is according to claim 1.

12. Authentification, verification or security marking, coloured or multicolour image for security use, or non-forgeable object or document of value, comprising at least one polymer film, wherein the at least one polymer film is according to claim 6.

13. An optical, electrooptical, information storage, decorative or security application, liquid crystal display, 3D display, projection system, polariser, compensator, alignment layer, circular polariser, colour filter, decorative image, liquid crystal pigment, reflective film with spatially varying reflection colours, multicolour image, non-forgeable document, identity card, credit card or banknote, which comprises a polymer film, wherein the polymer film is according to claim 6.

14. Optical component or device, polariser, patterned retarder, compensator, alignment layer, circular polariser, colour filter, decorative image, liquid crystal lens, liquid crystal pigment, reflective film with spatially varying reflection colours or multicolour image for decorative or information storage, comprising at least one polymerisable LC material wherein the at least one polymerisable LC material is according to claim 1.

15. Liquid crystal display comprising a polymer film, wherein the polymer film is according to claim 6.

16. Authentification, verification or security marking, coloured or multicolour image for security use, or non-forgeable object or document of value, comprising a polymerizable LC material wherein the polymerizable LC material is according to claim 1.

17. Authentification, verification or security marking, coloured or multicolour image for security use, or non-forgeable object or document of value, comprising a component or device according to claim 10.

18. A non-forgeable object or document of value, which is an identity card, a credit card or a banknote, comprising at least one polymer film, wherein the at least one polymer film is according to claim 6.

19. Polymerisable LC material according to claim 1, wherein, in formula I,
$R^1$ denotes —H or -methyl,
$R^2$ denotes each and independently and in each occurrence, methylene or ethylene, and
n denotes 2.

20. Polymerisable LC material according to claim 1, wherein, in formula II:
P is an acryl, methacryl, vinyl, vinyloxy, propenyl ether, epoxy, oxetane or styrene polymerisable group,
MG is of formula M,
M is -$(A^{21}\text{-}Z^{21})_k\text{-}A^{22}\text{-}(Z^{22}\text{-}A^{23})_l$-, wherein
$A^{21}$ to $A^{23}$ are in each occurrence independently of one another an aryl-, heteroaryl-, heterocyclic- or alicyclic group optionally being substituted by one or more identical or different groups L, preferably 1,4-cyclohexylene or 1,4-phenylene, 1,4 pyridine, 1,4-pyrimidine, 2,5-thiophene, 2,6-dithieno[3,2-b:2',3'-d]thiophene, 2,7-fluorine, 2,6-naphtalene, 2,7-phenanthrene optionally being substituted by one or more identical or different groups L, $Z^{21}$ and $Z^{22}$ are in each occurrence independently from each other, —O—, —S—, —CO—, —COO—, —OCO—, —S—CO—, —CO—S—, —O—COO—, —CO—NR$^{01}$-, —NR$^{01}$—CO—, —NR$^{01}$—CO—NR$^{02}$, —NR$^{01}$—CO—O—, —O—CO—NR$^{01}$—, —OCH$_2$—, —CH$_2$O—, —SCH$_2$—, —CH$_2$S—, —CF$_2$O—, —OCF$_2$—, —CF$_2$S—, —SCF$_2$—, —CH$_2$CH$_2$—, —(CH$_2$)$_4$—, —CF$_2$CH$_2$—, —CH$_2$CF$_2$—, —CF$_2$CF$_2$—, —CH=N—, —N=CH—, —N=N—, —CH=CR$^{01}$—, —CY$^{01}$=CY$^{02}$—, —C≡C—, —CH=CH—COO—, —OCO—CH=CH—, or a single bond, $R^0$ is alkyl, alkoxy, thioalkyl, alkylcarbonyl, alkoxycarbonyl, alkylcarbonyloxy or alkoxycarbonyloxy with 1 to 20 C atoms, which are optionally fluorinated, or is $Y^0$ or -Sp-P, $Y^0$ is F, Cl, CN, NO$_2$, OCH$_3$, OCN, SCN, optionally fluorinated alkylcarbonyl, alkoxycarbonyl, alkylcarbonyloxy or alkoxycarbonyloxy with 1 to 4 C atoms, or mono- oligo- or polyfluorinated alkyl or alkoxy with 1 to 4 C atoms, preferably F, Cl, CN, NO$_2$, OCH$_3$, or mono- oligo- or polyfluorinated alkyl or alkoxy with 1 to 4 C atoms $Y^{01}$ and $Y^{02}$ have each and independently the meaning as defined above in formula I, $R^{01}$ and $R^{02}$ have each and independently the meaning as defined above in formula I, and k and l are each and independently 0, 1, 2, 3 or 4.

21. Polymerisable LC material according to claim 20, wherein, in formula II:
$Z^{21}$ and $Z^{22}$ are, in each occurrence independently from each other, —COO—, —OCO—, —CO—O—, —O—CO—, —OCH$_2$—, —CH$_2$O—, -, —CH$_2$CH$_2$—, —(CH$_2$)$_4$—, —CF$_2$CH$_2$—, —CH$_2$CF$_2$—, —CF$_2$CF$_2$—, —C≡C—, —CH=CH—COO—, —OCO—CH=CH—, or a single bond, $R^0$ is alkyl, alkoxy, thioalkyl, alkylcarbonyl, alkoxycarbonyl, alkylcarbonyloxy or alkoxycarbonyloxy with 1 to 15 C atoms, which are optionally fluorinated, or is $Y^0$ or -Sp-P, $Y^0$ is F, Cl, CN, NO$_2$, OCH$_3$, or mono- oligo- or polyfluorinated alkyl or alkoxy with 1 to 4 C atoms, and k and l are each 1.

* * * * *